UNITED STATES PATENT OFFICE.

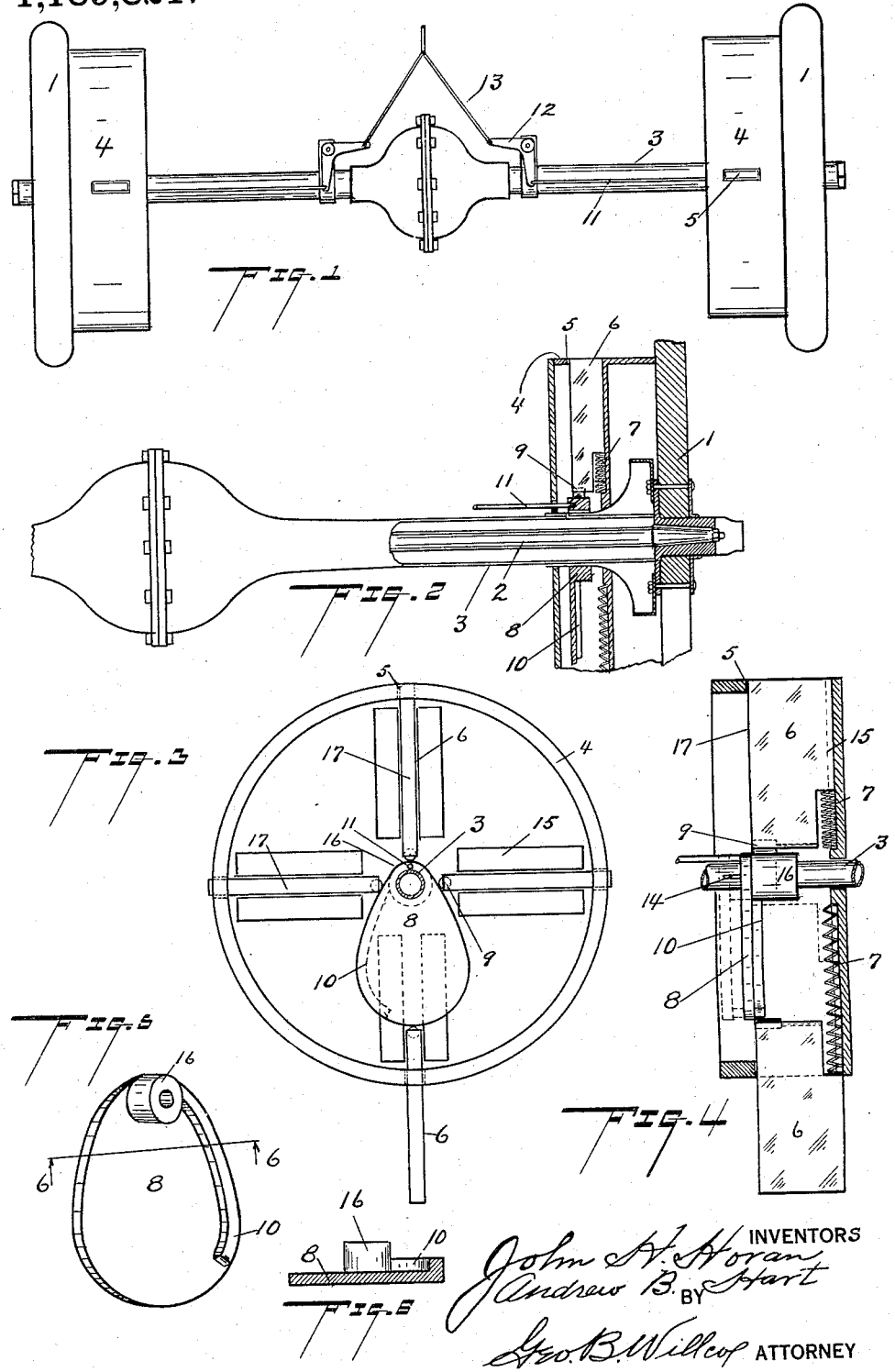

JOHN H. HORAN AND ANDREW B. HART, OF GRAYLING, MICHIGAN.

PADDLE ATTACHMENT FOR VEHICLE-WHEELS.

1,189,821.  Specification of Letters Patent.  Patented July 4, 1916.

Application filed March 24, 1916. Serial No. 86,355.

*To all whom it may concern:*

Be it known that we, JOHN H. HORAN and ANDREW B. HART, citizens of the United States, both residing at Grayling, in the county of Crawford and State of Michigan, have invented certain new and useful Improvements in Paddle Attachments for Vehicle-Wheels; and we do hereby declare the following to be a full, clear, and exact description of the invention, such as will enable others skilled in the art to which it appertains to make and use the same.

This invention is a propelling device for vehicles and pertains more particularly to a device by which vehicles adapted to travel on land, such as automobiles, may be provided with propelling means that will permit them to travel on the water, when provided with suitable buoyant bodies.

The objects of our present improvement are to provide a paddle wheel propelling device adapted to be attached to the rear wheels of an automobile and provided with means within the control of the driver, whereby the paddles may be quickly thrown into or out of action when the vehicle is to travel on the water, or on the land.

The type of paddle propelling mechanism which we prefer to employ in connection with our improvement is of that class in which the paddles are made to project radially outward while exerting their forward propelling force in the water and are radially retracted while traveling through the air.

With these and certain other objects in view, which will appear later in the specification, our invention consists of the devices described and claimed and the equivalents thereof.

In the drawings, Figure 1 is a top plan view of the rear axle and wheels of an auto with our improvement attached. Fig. 2 is a part sectional detail of the paddle-actuating device. Fig. 3 is a side view of the paddles and cam. Fig. 4 is an enlarged part sectional view of the paddle, drum and shiftable cam. Fig. 5 is a perspective view of the cam. Fig. 6 is a cross section of the cam on line 6—6 of Fig. 5.

As is clearly shown in the drawings, 1 represents the rear wheel of an automobile, 2 the shafts, and 3 the hollow axle, all of the usual construction.

To each of the wheels 1, we fix a cylindrical drum 4 adapted to revolve with the wheel and to turn about the stationary axle 3. The periphery of the drum is provided with a plurality of slots 5, through which project radially disposed and longitudinally movable paddles 6. The paddles are normally retracted toward the axle by means of tension springs 7, as shown in Fig. 4. A cam 8 is mounted on the axle 3 and is slidable lengthwise the axle, but not rotatable. Rollers 9 are provided on the inner ends of the paddles, to roll around the outer periphery of the cam 8 when the drum 4 is revolved. A lateral rib 10 is formed on the side of the cam 8 and extends part way around its periphery. The purpose of this rib is to facilitate engaging the cam with the radial paddles when the cam is shifted into operative position. A rod 11 is secured at one end to the cam and at the other end to an L-lever carried by the axle 3 and operating rods 13 extend to within the reach of the driver, whereby the cam 8 may be shifted lengthwise the axle 3 into operative position with relation to the paddles 6, or thrown out of operation, as indicated by the dotted lines in Fig. 4. The cam 8 is preferably slidably mounted on the axle 3 and prevented from rotation by means of a feather 14. The paddles 6 are guided by suitable guides 15 carried by the drum 4. The hub 16 of cam 8 projects laterally from the face of the cam far enough to be always in engagement with the rollers 9 of the paddles when the cam is in its inoperative position, as indicated by dotted lines in Fig. 4. When in this position the blades are all retracted, but when the cam is moved toward the wheel 1 by means of rod 11 the outer face of the lateral rib 10 on the cam first rides upon the side edges 17 of the paddles 6 until the end of the rib passes over a paddle, whereupon the cam slides endwise on the shaft, bringing the outer periphery of the rib 10 in the path of travel of the next roller 9. Thus in succession the paddles come into engagement with the outer periphery of the cam and as they travel around the axle they are successively projected and retracted.

By the means above described, we have produced a simple and relatively inexpensive paddle wheel device that is adapted to be applied to existing forms of automobile wheels and axles and can be used either in connection with automobiles or other like vehicles.

Having thus described our invention, what we claim and desire to secure by Letters Patent is:

1. The combination of a power driven vehicle wheel adapted to travel on land, a drum fixed to said wheel and stationary hollow axle, radially disposed and longitudinally movable paddles in said drum, springs adapted to normally retain said paddles in retracted position, a non-rotatable cam slidably mounted on said axle and actuating means whereby said cam may be moved lengthwise the axle and thrown into and out of engagement with said paddles.

2. The combination of a power driven vehicle wheel adapted to travel on land, a drum fixed to said wheel and stationary hollow axle, radially disposed and longitudinally movable paddles in said drum, springs adapted to normally retain said paddles in retracted position, a non-rotatable cam slidably mounted on said axle and actuating means whereby said cam may be moved lengthwise the axle and thrown into and out of engagement with said paddles, a laterally projecting hub on said cam adapted to be normally engaged by said paddles, and a lateral rib extending from the hub part way around the periphery of said cam, for the purposes set forth.

In testimony whereof, we affix our signatures in presence of two witnesses.

JOHN H. HORAN.
ANDREW B. HART.

Witnesses:
GEO. MAHON,
JAMES C. FORTESCUE.

Copies of this patent may be obtained for five cents each, by addressing the "Commissioner of Patents, Washington, D. C."